Sept. 29, 1953 G. I. DANLY ET AL 2,653,838
CONNECTING ROD JOINT
Filed May 2, 1951
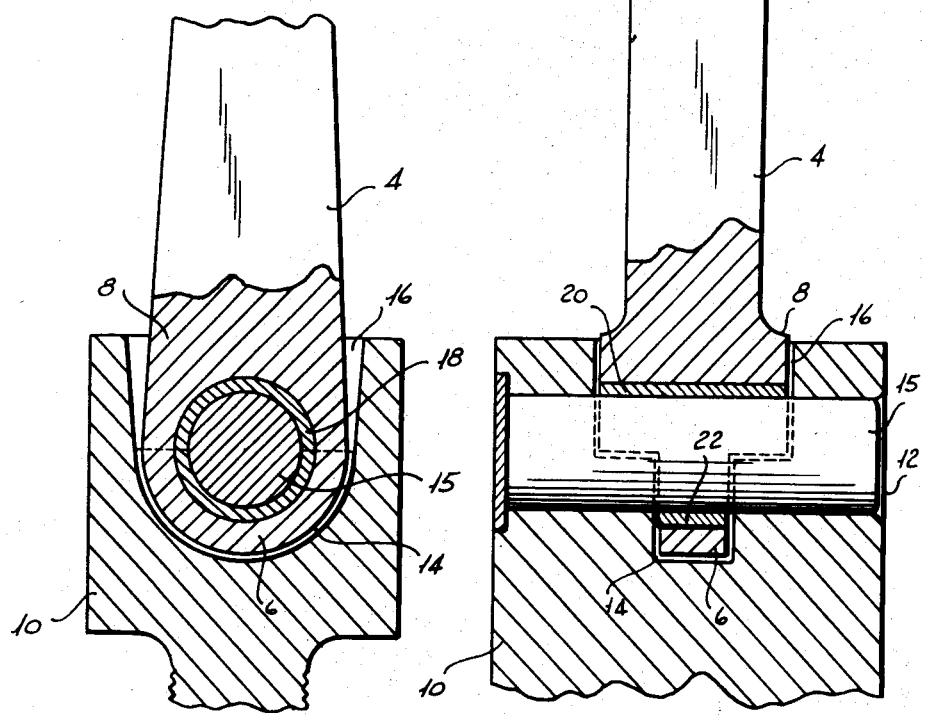
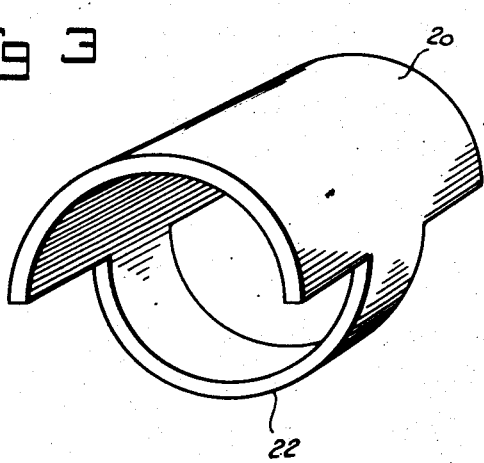
INVENTORS
GEORGE I. DANLY
VASIL GEORGEFF
BY
Attorney Patented Sept. 29, 1953

2,653,838

UNITED STATES PATENT OFFICE 2,653,838

CONNECTING ROD JOINT

George I. Danly, Elmhurst, and Vasil Georgeff, La Grange Park, Ill., assignors to Danly Machine Specialties, Inc., Chicago, Ill., a corporation of Illinois Application May 2, 1951, Serial No. 224,236

2 Claims. (Cl. 287—96)

In power presses large forces are present and the entire thrust must be transmitted to the ram through its joint to the pitman. So great are the forces involved, especially at times when the press is inadvertently overloaded, that failures have occurred. It has been the practice in the prior art to provide a knee joint to avoid bent or broken wrist pins. The construction of a knee joint at the lower end of a pitman involves a difficult and expensive machining operation. The external surface of the lower end of the pitman must be finish-machined and inasmuch as pitmans of power presses are frequently heavy and large pieces, not only is the machining difficult but it requires expensive equipment. Then too the external surface must be machined concentric with the internal bearing surface through which the wrist pin passes, adding to the difficulty and expense of the construction.

One object of our invention is to provide an improved connecting rod joint between the pitman and a reciprocating part of a power press which will transmit the thrust of the press through a wrist pin in a manner to avoid the bending or breaking of wrist pins.

Another object of our invention is to provide a strong and simple connecting rod joint with the use of a wrist pin and avoiding the expensive knee joint which is commonly used in the prior art.

Other and further objects of our invention will appear from the following description:

In the accompanying drawings which form part of the instant specification and which are to be read in conjunction therewith, and in which like reference numerals are used to indicate like parts in the various views:

Figure 1 is a side elevation of our improved rod joint with parts in section.

Figure 2 is a front elevation of our improved rod joint with parts in section.

Figure 3 is a perspective view showing the bearing bushing used in our joint.

In our copending application the connecting rod joint there shown employs a wrist pin which coacts with a bifurcated pitman end, thus enabling us to support the wrist pin not only adjacent its ends but also intermediate thereof. In the instant case the lower portion of the connecting rod is cut away and is formed with reduced cross-sectional area. In this manner the wrist pin is provided with a much increased bearing surface during the power or thrust stroke in such a manner as to preclude danger of bending or deflecting the pin. On the upstroke when the forces are light the wrist pin is provided with a decreased bearing surface and the connecting rod acts through the wrist pin through a smaller cross section of metal. The forces on the upstroke are comparatively small compared with those brought into play during the heavy loading when the press does its work.

More particularly referring now to the drawings, the pitman 4 is formed with its lower end cut away to provide a central portion 6 which is of reduced width compared with the upper portion 8 of the pitman. The member 10 which forms part of the ram of the press which is adapted to reciprocate is provided with a transverse bore 12 in which a wrist pin 15 is adapted to seat. The member 10 is also provided with a recess 14 which is curved along a semicircular arc corresponding to the curved portion of the lower end 6 of the pitman. The recess 14 terminates along a plane passing through the axis of the wrist pin 15 and joins an upper recess 16 which is much wider than the lower recess 14. The recess 16 is of a width to accommodate the lower end 8 of the pitman 4. A bushing, indicated generally by the reference numeral 18, is shown in Figure 3. The upper portion 20 of the bushing bears against the upper portion of the wrist pin and is positioned in the bore formed in the lower end of the pitman 4 through which the wrist pin passes. The lower portion 22 of the bushing 18 is adapted to coact with the lower portion 6 of the pitman and is positioned between this and the wrist pin 15. It will be noted that the area 20 of the bushing represents the area through which the pitman 4 transmits its thrust. The wrist pin is supported by the member 10, except through the width indicated by the width of the lower portion 22 of the bushing. It will thus be seen that during the heavy loading of the wrist pin danger of its deflection is substantially eliminated. On the upstroke, however, the loading is comparatively light and the portion 6 is sufficient, acting through the wrist pin, to lift the ram attached to member 10. This light thrust, furthermore, is amply supported by the wrist pin even though the gap bridged by the wrist pin is much greater. It will be noted, furthermore, that the bushing 18 provides a good working surface between the pitman and the wrist pin. The wrist pin may be made of hardened steel and ground to have an external diameter adapted to fit in the bore 12 and to fit the internal diameter of the bushing 18, which may be made of bronze.

As will be readily appreciated by those skilled in the art, our construction permits the transmission of heavy thrusts during the downward or working stroke without danger of deflecting the wrist pin since it is supported throughout the major portion of its length. The forces involved in the upward motion are of small magnitude compared with those existing during the working stroke so that the support for the wrist pin during the upward stroke by more widely separated points is sufficient.

It will be seen that we have accomplished the objects of our invention. We have provided an improved rod joint so that the thrust is amply supported during the working stroke by the provision of an increased bearing surface. Through the use of our improved joint we have obviated the necessity of using an expensive knee joint which is so difficult to construct. We have eliminated the necessity of two concentric finish-machined surfaces, which advantage alone makes our construction more economical than that of the prior art using knee joints.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a power press, a pitman and a reciprocating member, the pitman being formed with a lower end of reduced cross-sectional size, said pitman being provided with a transverse bore passing through both the reduced end portion and the pitman, the reciprocating member being formed with a stepped recess and receiving the lower end of the pitman, a pin lodged in the bore pivotally connecting the pitman end to the reciprocating member, the lower portion of the pin being supported by the reciprocating member throughout the major portion of its length and engaging the pitman throughout the width of said pitman.

2. A power press as in claim 1 including in combination a bushing formed with segments removed from both sides of the lower portion thereof, said bushing surrounding the pin, the construction being such that the removed sections of the bushing will permit the pin to be directly supported from the reciprocating member adjacent the major portion of the lower surface of the pin.

GEORGE I. DANLY.
VASIL GEORGEFF.

References Cited in the file of this patent

UNITED STATES PATENTS

| Number | Name | Date |
|---|---|---|
| 489,258 | Marks | Jan. 3, 1893 |
| 737,360 | Daly | Aug. 25, 1903 |
| 2,318,954 | Miller | May 11, 1943 |
| 2,573,549 | Danly et al. | Oct. 30, 1951 |